(12) United States Patent
Lemaire et al.

(10) Patent No.: US 11,052,580 B2
(45) Date of Patent: Jul. 6, 2021

(54) METHOD FOR PRODUCING A SOUNDPROOFING TRIM PANEL FOR THE INTERIOR OF A MOTOR VEHICLE

(71) Applicant: TREVES PRODUCTS, SERVICES & INNOVATION, Paris (FR)

(72) Inventors: Dominique Lemaire, Villiers devant le Thour (FR); Guillaume Crignon, Sillery (FR); Christophe Capron, Epoye (FR)

(73) Assignee: TREVES PRODUCTS, SERVICES & INNOVATION, Paris (FR)

( * ) Notice: Subject to any disclaimer, the term of this patent is extended or adjusted under 35 U.S.C. 154(b) by 261 days.

(21) Appl. No.: 16/093,311

(22) PCT Filed: Mar. 9, 2017

(86) PCT No.: PCT/FR2017/050535
§ 371 (c)(1),
(2) Date: Oct. 12, 2018

(87) PCT Pub. No.: WO2017/178717
PCT Pub. Date: Oct. 19, 2017

(65) Prior Publication Data
US 2019/0126518 A1    May 2, 2019

(30) Foreign Application Priority Data
Apr. 12, 2016   (FR) ..................... 1653229

(51) Int. Cl.
*B29C 43/20*    (2006.01)
*B32B 5/18*    (2006.01)
(Continued)

(52) U.S. Cl.
CPC ........ *B29C 43/203* (2013.01); *B29B 17/0042* (2013.01); *B29C 43/003* (2013.01);
(Continued)

(58) Field of Classification Search
None
See application file for complete search history.

(56) References Cited

U.S. PATENT DOCUMENTS 6,576,172 B1   6/2003   Ario et al.
7,789,197 B2 *  9/2010   Duval .................. G10K 11/168
                                                                  181/290
(Continued)

FOREIGN PATENT DOCUMENTS

DE    102006005369 B3    7/2007
EP       1847383 A1    10/2007
(Continued)

OTHER PUBLICATIONS

English translation of EP 2053593.*
International Search Report issued in corresponding application No. PCT/FR2017/050535, dated Jul. 5, 2017.

*Primary Examiner* — Mary Lynn F Theisen
(74) *Attorney, Agent, or Firm* — Murtha Cullina LLP

(57) ABSTRACT

The invention relates to a method of producing a sound proofing trim panel comprising the steps of providing an elastically compressible lower layer, heating the lower layer and placing it in a mould to shape it to form a spring layer of a spring-mass type damping system. The method further includes associating the lower layer with an upper layer, to form the mass of the spring-mass system. According to the invention, the lower layer comprises a blend of elastically compressible foam flakes forming at least 80 wt.-% of the lower layer and being mixed with binder fibres. The fibres comprising a core and a sheath that is fusible at a moderate temperature, and the flakes being bonded to one another by means of the fusing of the sheath forming a binder, such that the lower layer takes the form of a bonded foam.

10 Claims, 1 Drawing Sheet

(51) Int. Cl.

| | |
|---|---|
| *B29B 17/00* | (2006.01) |
| *B32B 27/06* | (2006.01) |
| *B60R 13/08* | (2006.01) |
| *B29C 43/00* | (2006.01) |
| *B32B 5/16* | (2006.01) |
| *B32B 5/02* | (2006.01) |
| *B32B 27/08* | (2006.01) |
| *B32B 27/12* | (2006.01) |
| *B32B 5/24* | (2006.01) |
| *B32B 5/22* | (2006.01) |
| *B29C 44/08* | (2006.01) |
| *B29C 44/12* | (2006.01) |
| *B32B 7/04* | (2019.01) |
| *D04H 1/542* | (2012.01) |
| *D04H 13/00* | (2006.01) |
| *B29C 51/14* | (2006.01) |
| *G10K 11/168* | (2006.01) |
| *B32B 27/14* | (2006.01) |
| *B32B 27/36* | (2006.01) |
| *B32B 27/40* | (2006.01) |
| *B62D 65/14* | (2006.01) |
| *B29K 105/04* | (2006.01) |
| *B29K 105/26* | (2006.01) |
| *B29K 105/12* | (2006.01) |
| *B29L 31/30* | (2006.01) |
| *B29K 75/00* | (2006.01) |
| *B29K 105/00* | (2006.01) |

(52) U.S. Cl.
CPC .......... *B29C 44/08* (2013.01); *B29C 44/1209* (2013.01); *B29C 51/14* (2013.01); *B32B 5/022* (2013.01); *B32B 5/16* (2013.01); *B32B 5/18* (2013.01); *B32B 5/22* (2013.01); *B32B 5/245* (2013.01); *B32B 7/04* (2013.01); *B32B 27/065* (2013.01); *B32B 27/08* (2013.01); *B32B 27/12* (2013.01); *B32B 27/14* (2013.01); *B32B 27/36* (2013.01); *B32B 27/40* (2013.01); *B60R 13/08* (2013.01); *B60R 13/0815* (2013.01); *B62D 65/14* (2013.01); *D04H 1/542* (2013.01); *D04H 13/00* (2013.01); *G10K 11/168* (2013.01); *B29K 2075/00* (2013.01); *B29K 2105/04* (2013.01); *B29K 2105/12* (2013.01); *B29K 2105/251* (2013.01); *B29K 2105/26* (2013.01); *B29K 2995/0002* (2013.01); *B29K 2995/0063* (2013.01); *B29L 2031/3005* (2013.01); *B29L 2031/3041* (2013.01); *B32B 2250/03* (2013.01); *B32B 2250/04* (2013.01); *B32B 2250/24* (2013.01); *B32B 2250/40* (2013.01); *B32B 2255/02* (2013.01); *B32B 2255/10* (2013.01); *B32B 2255/102* (2013.01); *B32B 2262/0276* (2013.01); *B32B 2262/12* (2013.01); *B32B 2264/10* (2013.01); *B32B 2264/104* (2013.01); *B32B 2266/0278* (2013.01); *B32B 2272/00* (2013.01); *B32B 2274/00* (2013.01); *B32B 2305/70* (2013.01); *B32B 2307/102* (2013.01); *B32B 2307/51* (2013.01); *B32B 2307/718* (2013.01); *B32B 2307/72* (2013.01); *B32B 2307/7265* (2013.01); *B32B 2307/732* (2013.01); *B32B 2307/734* (2013.01); *B32B 2307/738* (2013.01); *B32B 2471/02* (2013.01); *B32B 2605/00* (2013.01); *B32B 2605/003* (2013.01)

(56) References Cited

U.S. PATENT DOCUMENTS

| | | | |
|---|---|---|---|
| 2006/0113146 A1* | 6/2006 | Khan | B32B 5/18 |
| | | | 181/286 |
| 2006/0201741 A1* | 9/2006 | Inoue | G10K 11/16 |
| | | | 181/204 |
| 2009/0065298 A1* | 3/2009 | Ueno | B60N 3/048 |
| | | | 181/287 |
| 2012/0037447 A1* | 2/2012 | Duval | B32B 7/02 |
| | | | 181/290 |
| 2013/0009087 A1 | 1/2013 | Koo et al. | |
| 2014/0265413 A1* | 9/2014 | Demo | B60R 13/0815 |
| | | | 296/39.3 |
| 2016/0035338 A1* | 2/2016 | Koo | B32B 27/32 |
| | | | 181/294 |
| 2019/0118506 A1* | 4/2019 | Baudry | B62D 35/02 |

FOREIGN PATENT DOCUMENTS

| | | |
|---|---|---|
| EP | 2053593 A2 | 4/2009 |
| JP | H07205169 A | 8/1995 |
| JP | H08282402 A | 10/1996 |

\* cited by examiner

METHOD FOR PRODUCING A SOUNDPROOFING TRIM PANEL FOR THE INTERIOR OF A MOTOR VEHICLE

CROSS-REFERENCE TO RELATED APPLICATION

This application claims the benefit of International application number PCT/FR2017/050535, filed Mar. 9, 2017 and French patent application number 1653229, filed on Apr. 12, 2016, the entire contents of which are incorporated herein by reference.

TECHNICAL FIELD

The invention relates to a method for producing a soundproofing trim panel for the interior of a motor vehicle, a panel obtained by such a method and a mounting of such a panel.

BACKGROUND

It is known to implement a method for producing a soundproofing trim panel for the interior of a motor vehicle, the method comprising the following steps:
providing an elastically compressible lower layer, the layer being able to be shaped by heating in such a way as to be able to adopt a stable geometry after shaping,
heating the lower layer and placing same in a mould such as to shape it to form a spring layer of a "spring-mass" type insulation system,
associating same with an upper layer forming the mass of the "spring-mass" system, the upper layer being of a sealed or porous nature and being associated with a sealing layer arranged between the upper and lower layers.

In the known embodiments, the lower layer has notably a felt base provided with a binder, which has a high area density, which results in a panel of substantial weight.

Yet, for the purposes of saving weight in vehicles, it is important to reduce the weight of soundproofing panels.

To do this, it could be provided to use, for the lower layer, a felt of less density.

However, such a way of proceeding risks leading to a felt that does not have the required elasticity characteristics and/or that has the characteristics but at the price of notable extra cost, as it is for example the case for felts that are produced with a base of expensive microfibres.

SUMMARY OF THE INVENTION

The invention has for purpose to propose a method for producing a panel that has a lower layer of low area density and low cost, the layer being able in particular to partially come from recycling.

To this effect, and according to a first aspect, the invention proposes a method for producing a soundproofing trim panel for the interior of a motor vehicle, the method comprising the following steps:
providing an elastically compressible lower layer, the layer being able to be shaped by heating in such a way as to be able to adopt a stable geometry after shaping,
heating the layer and arranging it in a mould such as to shape it to form a spring layer of a insulation system of the "spring-mass" type,
associating same with an upper layer forming the mass of the "spring-mass" system, the upper layer being of a sealed or porous nature and associated with a sealing layer arranged between the upper and lower layers,
the method furthermore having the following characteristics:
the lower layer is made from a blend of elastically compressible foam flakes, the flakes being in particular from recycling,
the flakes form at least 80% by weight of the lower layer,
the flakes are mixed with binder fibres, the fibres comprising a core, the core that may or may not be fusible at a high temperature, and a sheath that is fusible at a moderate temperature, the flakes being bonded to one another by means of the fusing of the sheath forming a binder, such that the lower layer takes the form of a bonded foam.

With the arrangement proposed, there is a panel wherein the lower layer can have a low area density, with the condition of providing flakes with a sufficiently low density, which allows for a lessening of the panel in relation to known embodiments.

Usually, a lower layer with a foam base of low density, for example of about 0.020 kg/liter, does not have the expected characteristics to act as a good spring in a "spring-mass" system.

Yet, surprisingly, the applicant observed that a lower layer such as being considered, even with very low densities, has good effectiveness in terms of spring in such a system.

According to other aspects, the invention proposes a panel obtained by such a method and a mounting of such a panel.

BRIEF DESCRIPTION OF THE DRAWINGS

Other particularities and advantages of the invention shall appear in the following description, given in reference to the accompanying figures, wherein.

DETAILED DESCRIPTION

Figure 1:
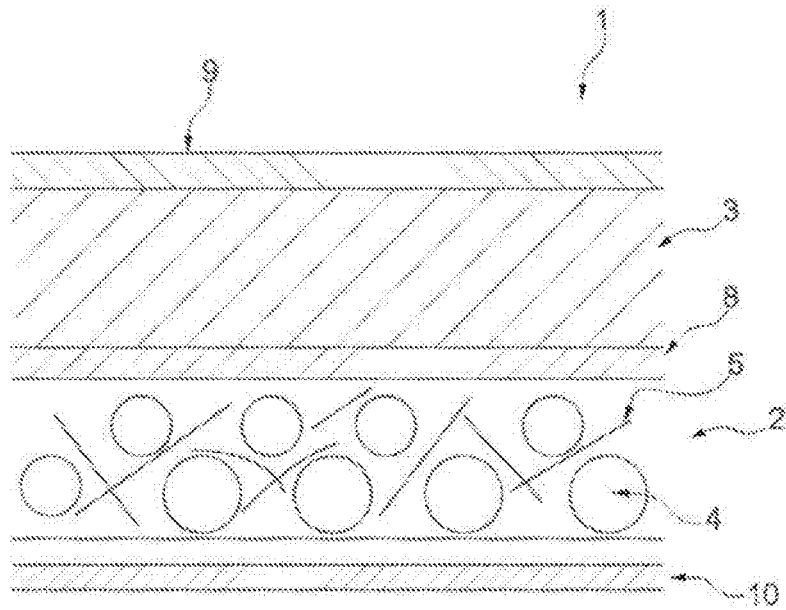
FIG. 1 is a cross-section schematic view of a panel according to an embodiment mounted in a vehicle.
Figure 2:
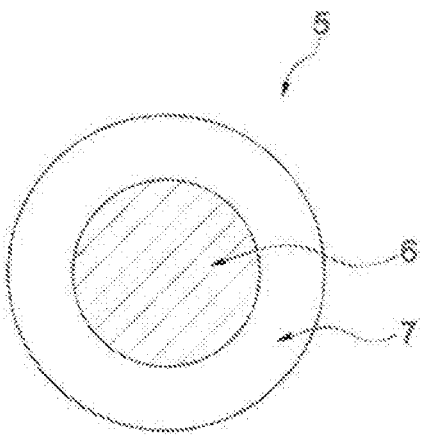
FIG. 2 is a cross-section schematic view of a binder fibre.

In reference to the figures, a method for producing a soundproofing trim panel 1 for the interior of a motor vehicle is described, the method comprising the following steps:
providing an elastically compressible lower layer 2, the layer being able to be shaped by heating in such a way as to be able to adopt a stable geometry after shaping,
heating the lower layer and placing same in a mould such as to shape it to form a spring layer of a "spring-mass" type insulation system,
associating same with an upper layer 3 forming the mass of the "spring-mass" system, the upper layer being of a sealed or porous nature and associated with a sealing layer 8 arranged between the upper and lower layers,
the method furthermore having the following characteristics:
the lower layer is made from a blend of elastically compressible foam flakes 4, the flakes being in particular from recycling,
the flakes form at least 80% by weight of the lower layer,
the flakes are mixed with binder fibres 5, the fibres comprising a core 6, the core that may or may not be fusible at a high temperature, and a sheath 7 that is fusible at a moderate temperature, the flakes being bonded to one another by means of the fusing of the sheath forming a binder, such that the lower layer takes the form of a bonded foam.

In particular, the lower layer 2 has a substantially homogeneous area density.

According to an embodiment, the lower layer 2 can have after shaping a thickness able to vary from 40 mm, in the non-compressed portion, to 5 mm, in the highly compressed portion.

In particular, it is provided to compress the lower layer 2, for example at the periphery of the panel 1 or according to the size constraints around the panel in the vehicle.

The association between the upper 3 and lower 2 layers is done in particular during the step of shaping the lower layer, the upper layer being arranged in the mould as superposition on the lower layer.

According to an embodiment, the lower layer 2 has before its shaping in the mould a density less than 0.025 kg/liter, and in particular less than 0.020 kg/liter.

According to an embodiment, the lower layer 2 has before its shaping in the mould a thickness less than 50 mm, and in particular of about 40 mm.

According to an embodiment not shown, the lower layer 2 can be covered with a protective layer on at least one of its faces, the layer making it possible to facilitate the preheating before shaping and also to protect the lower layer during the handling of the panel 1, this layer able to be of a nature of the polyester "Spun" type from 20 to 30 g/m$^2$ or non-woven.

It is as such possible to have a lower layer 2 with an area density less than 1000 g/m$^2$, and in particular less than or equal to 700 g/m$^2$.

According to an embodiment, the flakes 4 occupy between 90 and 80% by weight of the lower layer 2, and in particular between 87 and 83%, and in particular of about 85% in such a way that the fibres 5 occupy between 10 and 20% by weight of the layer, and in particular between 13 and 17%, and in particular of about 15%.

According to an embodiment, the core 6 has a polyester base and the sheath 7 has a copolyester base.

According to an embodiment, the fibres have a content between 1.7 and 6 dtex, and in particular of about 4.4 dtex.

According to an embodiment, the flakes 4 of the lower layer 2 have a polyurethane base.

According to an embodiment, the upper layer 3 has a minimum area density of 700 g/m$^2$.

According to the embodiment shown, the upper layer 3 is porous and the method further comprises a step of placing a sealing layer 8 between the upper layer and the lower layer 2, the sealing layer being in particular in the form of a thermoplastic film or sealed coated non-woven material, in particular with a thickness less than 200 microns, in such a way that the panel 1 forms an insulating system, of the "spring-mass" type, and absorbent through the porosity of the upper layer.

According to an embodiment, the upper layer 3 is, when it is porous, with a base of foam flakes, in particular polyurethane, bonded to one another by a binder, in particular in the form of binder fibres such as described hereinabove.

According to another embodiment, the upper layer 3 is, when it is porous, with a fibre base, bonded to one another by a binder, in particular in the form of binder fibres such as described hereinabove.

According to an embodiment, the upper layer 3, when it is porous, can be loaded with dense particles, for example of a thermoplastic elastomer base loaded with a mineral filler.

According to an embodiment not shown, the upper layer 3 is sealed, having in particular a thermoplastic elastomer base—in particular of ethylene propylene diene monomer—provided with a dispersed filler, in particular a mineral filler—in particular with a baryte or calcium carbonate base —, in such a way that the panel 1 produces a soundproofing of the "spring-mass" type.

According to the embodiment shown, the method further provides to arrange a layer of coating 9, in particular with a carpet base, on the upper layer 3, in such a way as to form a floor mat of the vehicle.

A panel 1 produced by such a method shall now be described, the panel comprising:

a lower layer 2 shaped by heat in order to form the spring layer of an insulation system of the "spring-mass" type, and an upper layer 3 forming the mass of the "spring-mass" system, the upper layer being of a sealed or porous nature and associated with a sealing layer 8 arranged between the upper and lower layers, the panel further having the following characteristics:

the lower layer is made from a blend of elastically compressible foam flakes 4, the flakes being in particular from recycling, the flakes form at least 80% by weight of the lower layer, the flakes are mixed with binder fibres 5, the fibres comprising a core 6, the core that may or may not be fusible at a high temperature, and a sheath 7 that is fusible at a moderate temperature, the flakes being bonded to one another by means of the fusing of the sheath forming a binder, such that the lower layer takes the form of a bonded foam.

According to an embodiment, the lower layer 2 can have a variable thickness that can vary from 40 mm, in the non-compressed portion, to 5 mm, in the highly compressed portion.

In particular, it can be provided to compress the lower layer 2, for example at the periphery of the panel 1 or according to the size constraints around the panel in the vehicle.

According to an embodiment, the lower layer 2 has in the non-compressed portion a density less than 0.025 kg/liter, and in particular less than 0.020 kg/liter, a density as low as this can be achieved thanks to the use of two-component fibres 5, and this without affecting the performance of the layer as a spring.

According to an embodiment, the lower layer 2 can be covered with a protective layer, not shown, on at least one of its faces, this layer able to be of the polyester "Spun" type from 20 to 30 g/m2 or non-woven.

Such a protective layer can in particular facilitate the shaping of the lower layer 2, in particular during a step of preheating, and also protect the layer during the handling of the panel 1, According to an embodiment, the lower layer 2 has an area density less than 1000 g/m$^2$, and in particular less than or equal to 700 g/m$^2$, for a thickness ranging up to 40 mm, which is much less than the area densities usually observed for spring layers.

According to an embodiment, the flakes 4 occupy between 90 and 80% by mass of the lower layer 2, and in particular between 87 and 83%, and in particular of about 85% in such a way that the fibres 5 occupy between 10 and 20% by weight of the layer, and in particular between 13 and 17%, and in particular of about 15%.

A mounting of such a panel 1 is finally described, the mounting comprising the panel and a structural wall 10 of the body of the vehicle, the panel being placed on the wall, the lower layer 2 being turned towards the wall.

What is claimed is:

1. A method for producing a soundproofing trim panel for the interior of a motor vehicle, the method comprising the following steps:
providing an elastically compressible lower layer, the layer being able to be shaped by heating in such a way as to be able to adopt a stable geometry after shaping,
heating the lower layer and placing in a mould such as to shape it to form a spring layer of a spring-mass type insulation system,
associating the lower layer with an upper layer forming the mass of the spring-mass system, the upper layer being of a sealed or porous nature and associated with a sealing layer arranged between the upper and lower layers,
the method being wherein:
the lower layer is made from a blend of elastically compressible foam flakes, the flakes being from recycling,
the flakes form at least 80% by weight of the lower layer,
the flakes are mixed with binder fibres, the fibres comprising a core, and a sheath that is fusible at a moderate temperature, the flakes being bonded to one another by means of the fusing of the sheath forming a binder, such that the lower layer takes the form of a bonded foam.

2. The method according to claim 1, wherein the lower layer has before its shaping in the mould a density less than 0.025 kg/liter.

3. The method according to claim 1, wherein the lower layer has before its shaping in the mould a thickness less than 50 mm.

4. The method according to claim 1, wherein the flakes occupy between 90 and 80% by weight of the lower layer such that the fibres occupy between 10 and 20% by weight of the layer.

5. The method according to claim 1, wherein the flakes of the lower layer have a polyurethane base.

6. The method according to claim 1, wherein the upper layer has a minimum area density of 700 g/m$^2$.

7. The method according to claim 1, wherein the upper layer is porous and in that the method further comprises a step of placing a sealing layer between the upper layer and the lower layer, the sealing layer being in the form of a thermoplastic film or of a sealed coated non-woven material, with a thickness less than 200 microns, the panel forming an insulating system, of the spring-mass type, and absorbent through the porosity of the upper layer.

8. The method according to claim 1, wherein the upper layer is sealed, with a thermoplastic elastomer base provided with a dispersed filler, the panel producing a sound insulation of the spring-mass type.

9. A panel produced by a method according to claim 1, the panel comprising:
a lower layer shaped by heat in order to form the spring layer of an insulation system of the spring-mass type,
and an upper layer forming the mass of the spring-mass system, the upper layer being of a sealed or porous nature and associated with a sealing layer arranged between the upper and lower layers,
the panel wherein:
the lower layer is made from a blend of elastically compressible foam flakes, the flakes being from recycling,
the flakes form at least 80% by weight of the lower layer,
the flakes are mixed with binder fibres, the fibres comprising a core, the core that may or may not be fusible at a high temperature, and a sheath that is fusible at a moderate temperature, the flakes being bonded to one another by means of the fusing of the sheath forming a binder, such that the lower layer takes the form of a bonded foam.

10. A mounting of a panel according to claim 9, the mounting comprising the panel and a structural wall of the body of the vehicle, the panel being placed on the wall, the lower layer being turned towards the wall.

* * * * *